(12) United States Patent
Narala

(10) Patent No.: US 11,275,701 B2
(45) Date of Patent: Mar. 15, 2022

(54) SECURE TIMER SYNCHRONIZATION BETWEEN FUNCTION BLOCK AND EXTERNAL SOC

(71) Applicant: QUALCOMM Incorporated, San Diego, CA (US)

(72) Inventor: Naveen Kumar Narala, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 16/910,194

(22) Filed: Jun. 24, 2020

(65) Prior Publication Data

US 2021/0406207 A1 Dec. 30, 2021

(51) Int. Cl.
| | |
|---|---|
| G06F 13/00 | (2006.01) |
| G06F 12/00 | (2006.01) |
| G06F 13/16 | (2006.01) |
| G06F 9/32 | (2018.01) |
| G06F 13/372 | (2006.01) |
| G06F 9/30 | (2018.01) |

(52) U.S. Cl.
CPC ...... *G06F 13/1689* (2013.01); *G06F 9/30101* (2013.01); *G06F 9/327* (2013.01); *G06F 13/372* (2013.01)

(58) Field of Classification Search
CPC .. G06F 13/1689; G06F 9/30101; G06F 9/327; G06F 13/372; G06F 12/00
See application file for complete search history.

(56) References Cited

U.S. PATENT DOCUMENTS

| | | | |
|---|---|---|---|
| 6,745,320 B1* | 6/2004 | Mitsuishi | G06F 9/30189 712/225 |
| 2008/0091925 A1* | 4/2008 | Hansen | G06F 9/30025 712/222 |
| 2018/0300617 A1* | 10/2018 | McBride | G06N 3/08 |

* cited by examiner

*Primary Examiner* — Tuan V Thai
(74) *Attorney, Agent, or Firm* — The Marbury Law Group/Qualcomm

(57) ABSTRACT

Various embodiments include methods and systems performed by a processor of a first function block for providing secure timer synchronization with a second function block. Various embodiments may include storing, in a shared register space, a first time counter value in which the first time counter value is based on a global counter of the second function block, transmitting, from the shared register space, the stored first time counter value to a preload register of the first function block, receiving, by the first function block, a strobe signal from the second function block configured to enable the first time counter value in the preload register to be loaded into a global counter of the first function block, and configuring the global counter with the first time counter value from the preload register.

24 Claims, 9 Drawing Sheets

SECURE TIMER SYNCHRONIZATION BETWEEN FUNCTION BLOCK AND EXTERNAL SOC

BACKGROUND

Computing devices and systems are increasingly being implemented in a piecewise manner, such that a number of devices in a system may include intellectual property belonging to different parties. For example, a system-on-a-chip (SOC) may be included in a system with an external third-party SOC, such that the SOC must communicate with the external SOC as efficiently as possible to perform functions of the system. Communication between devices may create the risk of exposing the intellectual property of devices to external third-party devices. This is may be problematic in wireless devices implementing Discontinuous Reception (DRX), in which wireless devices are powered on and off frequently to conserve battery power while performing processes for implementing various radio access technologies (RATs). Repeatedly power cycling devices may further increase the risk of unauthorized access to intellectual property when performing time-syncing at boot up of one or more devices within a system. Further, global counters or clock signals in systems implementing DRX may suffer from jitter and require additional time to synchronize devices within the system.

SUMMARY

Various embodiments provide solutions for performing secure timer synchronization between a function block and external integrated circuits. Various aspects may include storing a first time counter value in a shared register space, wherein the first time counter value is based on a global counter of the second function block, transmitting the stored first time counter value from the shared register space to a preload register of the first function block, receiving, by the first function block, a strobe signal from the second function block configured to enable the first time counter value in the preload register to be loaded into a global counter of the first function block, and configuring the global counter of the first function block with the first time counter value from the preload register. In some aspects, the shared register space is a portion of the first function block.

In some aspects, the strobe signal may be further configured to enable the first function block to store a second time counter value based on a global counter of the first function block. Such aspects may further include storing the second time counter value in counter latch registers of the first function block. Such aspects may further include determining whether the first time counter value is offset from the second time counter value by a time offset outside an offset threshold range, and configuring the shared register space to transmit the stored first time counter value to the preload register in response to determining that the time offset is outside the offset threshold range. Such aspects may further include receiving a reference clock signal from an external clock source in which the global counters of the first and second function blocks are based at least on the reference clock signal.

Such aspects may further include transmitting to the second function block an interrupt signal configured to enable the second function block to transmit the first time counter value to the shared register space, and receiving the first time counter value from the second function block.

Such aspects may further include configuring the shared register space to prevent the stored first time counter value from being transmitted to the preload register, and configuring an external strobe enable register of the first function block to prevent the strobe signal from configuring the preload register to load the time counter value into the global counter.

Further aspects may include an electronic device including a first function block, a second function block and a shared register space in which the first function block includes a processor configured to perform operations of any of the methods summarized above. Further aspects may include an electronic device including a first function block, a second function block, a shared register space and means for performing functions of any of the methods summarized above. Further aspects include a function block for use in an electronic device that includes another function block, in which the function block includes a preload register, a global counter, and a processor configured to perform operations of any of the method summarize above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the various embodiments.

DETAILED DESCRIPTION

Figure 1:
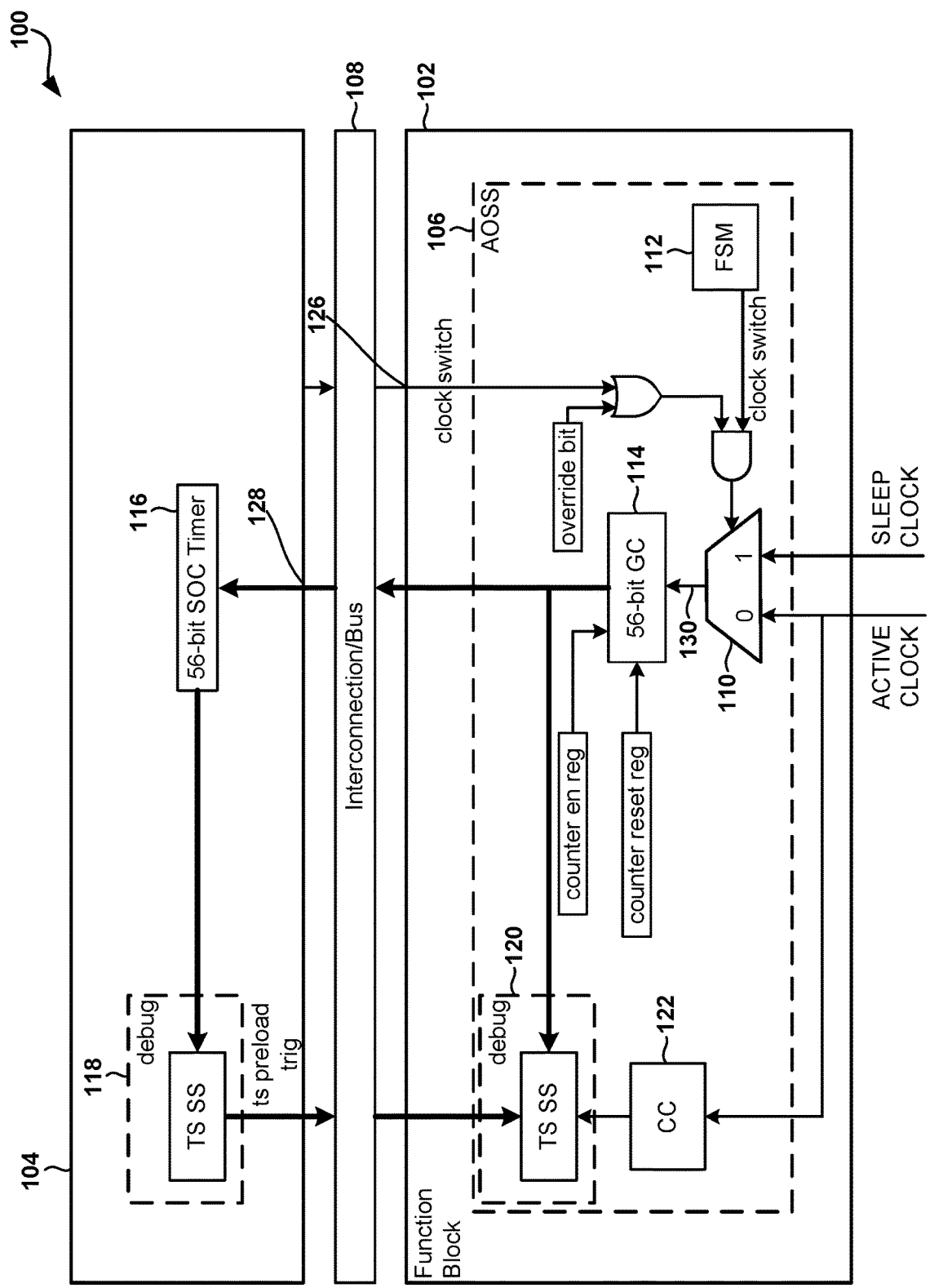
FIG. 1 illustrates an example of a conventional system 100 for performing timer synchronization.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide solutions for performing secure timer synchronization between a function block and external ICs. In some embodiments, secure timer synchronization may include implementing a shared register space in a function block through which another function block or system-on-chip (SOC) may communicate with the function block. In some embodiments, the shared register space may block the SOC from accessing the global counter configuration register access of the function block to avoid intellectual property (external SOC) contamination. Some embodiments may allow an SOC to initiate a timer synchronization procedure during boot and during a resynchronization process as determined by the function block to eliminate excess jitter. In some embodiments, the function block may determine when jitter or timer drift introduced by continuously switching the function block between active mode and sleep mode may be outside of a tolerable threshold, and may correct the timer drift by resynchronizing the function block with the SOC.

The following description is directed to certain implementations for the purposes of describing the innovative aspects of this disclosure. However, a person having ordinary skill in the art will readily recognize that the teachings herein may be applied in a multitude of different ways.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

Various wireless devices may be capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

The terms "system-on-a-chip" and SOC are used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system-in-a-package" (SIP) is used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "network-on-a-chip" (NOC) is used herein to refer to a network-based communications subsystem on an IC. In some embodiments, a NOC may be a Clos NOC.

The term "function block" is used herein to refer to a grouping of one or more electronic circuit components useable to perform various functions. In various embodiments, a function block may include components useable to perform functions related to secure timer synchronization between the function block and one or more external components. A function block may include various hardware, software, and/or firmware to implement various embodiments. For example, a function block may be or include an SOC, SIP, NOC, and various subsystems. A function block may include various clocking components, memory registers, logic gating bus interfaces, multiplexors, and other electrical components to implement various embodiments for secure timer synchronization.

A conventional computing system may include two or more distinct devices, such as SOCs, NOCs, or any kind of IC, where the devices in the system communicate data and configuration signals to perform operations of the system. The various devices within a system often require timer or clock synchronization, such as from a global timer or clock, to perform operations of the system correctly. In particular, synchronized timers and clocks may be need so that configuration and data signals are transmitted and received between devices in proper order and sequence.

Synchronization of a global clock between an IC and a third-party IC within a single system may require the third-party IC to access certain memory registers within the other IC. Allowing a third-party IC to access memory registers of another IC may increase the risk for the third-party IC to gain unauthorized access to data and intellectual property.

Systems including multiple ICs performing operations according to a synchronous global clock may experience jitter during transitions between various clock modes (e.g., active mode, sleep mode). Jitter introduced into clock cycles of one or more devices intended to be synchronized may cause a synchronized global clocking scheme to become unsynchronized. Performing operations or communications between devices that have become unsynchronized may cause a number of problems, including system crashes, boot failure, debugging failure, lost instructions and/or device-to-device communications or instructions received out of order, and global clock synchronization delay (i.e., increased time to resynchronize devices) if unsynchronized timers is detected.

Global clock synchronization delay caused by jitter may be especially problematic in systems implementing configurations in which one or more ICs are power cycled for purposes of conserving battery life/power draw. Wireless communication systems using various RATs may implement DRX to enable wireless devices to conserve battery power. DRX may be activated on an IC of a wireless device to conserve power by powering down a significant portion of the circuitry of the IC when there are no incoming data packets to be processed. While in a DRX mode, the IC may receive configuration information from the physical downlink control channel (PDCCH) to determine when data packets are incoming, and thus when the IC should reactivate powered-down portions in preparation for receiving data packets. Continuously power cycling portions of an IC, which may require clock resynchronization with other ICs in the system upon power up/boot up, may involve complex timing schemes to maximize power conservation while ensuring wireless communications services and user experiences are not degraded. Continuously correcting for jitter, such as eliminating jitter by repeatedly loading a reference clock from an external source among all devices intending to be synchronized, may be time consuming and demanding on available computing resources.

Jitter caused by repeated power cycling may eventually cause synchronized devices to become unsynchronized, affecting the performance of systems implementing configurations such as DRX. For example, jitter may cause a wireless device implementing DRX to wake up prematurely causing more power to be consumed, or may cause the wireless device to become unavailable to perform certain processes while transitioning between active and sleep modes at incorrect times. Further, the security risks of an external IC gaining unauthorized access to private information from another IC may be increased as a result of trading adequate security measures (e.g., increased or more complex "hand-shaking" protocols) in place of adequate wireless communications efficiency, power conservation, and jitter reduction, especially in systems implementing DRX configurations.

FIG. 1 illustrates an example of a conventional system 100 for performing timer synchronization. In the illustrated example, the system 100 includes a function block 102 configured to transmit and receive configuration and data signals with an SOC 104 through an Interconnection/Bus 108.

In the illustrated example, the function block 102 may include an always-on subsystem (AOSS) 106. The circuitry within the AOSS 106 may continue to be powered during a "sleep" mode, such as when DRX is implemented in a wireless communications device to conserve battery life. The function block 102 may be in a "sleep" mode (i.e. low power mode) or an "active"/on mode (high power mode) depending on a clock signal received from an external source or device, such as a power management IC (PMIC). The function block 102 may include a multiplexor 110 within the AOSS 106 to receive a global clock 130, either an active clock signal (e.g., 19.2 MHz clock) or sleep clock signal (e.g., 32 kHz clock), which may then be relayed to the 56-bit global counter (GC) 114. The function block 102 and the SOC 104 may share the global clock 130 to perform synchronous operations defined by the system 100. For example, the reference clocks for the SOC 104 and the multiplexor 110 may be sourced from a PMIC crystal oscillator (not shown) on the interconnection/bus 108, relayed into clock ports 126 of the function block 102, and then distributed to the multiplexor 110 and the SOC 104 in clock signal 128.

The global clock 130 may be received by the function block 102 and the SOC 104, and retained by both the function block 102 and the SOC 104 to perform operations independently. For example, when receiving a change in the global clock 130 (i.e. between active and sleep modes), the multiplexor 110 may relay the global clock to the 56-bit GC 114. The AOSS 106 may include counter enable registers and counter reset registers to update the global clock in 56-bit GC 114 based on the global clock 130 signal received from the multiplexor 110. The 56-bit GC 114 may pass the global clock signal through the interconnection/bus 108 to a 56-bit SOC timer 116 within the SOC 104. The function block 102 and the SOC 104 may then cease communications or otherwise operate independently while maintaining a synchronized clock signal. The 56-bit GC 114 and the 56-bit SOC timer 116 need to be synchronized to have a common time base for performing debug trace correlation between the function block 102 and the SOC 104, and to transmit, receive, and/or interpret communications and instructions based on a synchronized time.

The function block 102 and the SOC 104 may include subsystems, such as a time stamp (TS) subsystem (TS SS) 118 and a TS SS 120. The TS SS 118 and TS SS 120 may perform debugging operations according to the global clock received from the 56-bit SOC timer 116 and 56-bit GC 114 respectively. The AOSS 106 may include clock functional switch module (FSM) 112 that may switch the clock reference from one clock reference to another (e.g., from 19.2 MHz to 32 kHz) when the function block goes into a low power mode (e.g., goes to sleep), and a clock controller (CC) 122 that provides a clock to debug the TS SS.

Conventional system architectures involving synchronization between a function block and an SOC, such as illustrated by the multi-IC system 100, do not provide adequate security measures to prevent an external IC (i.e. an external IC or device to be synchronized with a function block) from accessing sensitive information within the function block. For example, implementations of systems may include the function block 102 communicating with an external third-party IC in place of the SOC 104. Conventional systems do not include provisions to prevent an external IC from attempting to access registers within a function block at inappropriate times (e.g., unexpected synchronization, unauthorized access attempts), which may lead to system crashes and/or data corruption. Additionally, the level of access that an external third-party IC may have within a conventional implementation may put intellectual property and trade secrets at risk of exposure. Implementing some level of security between a function block and an external third-party IC may also introduce jitter issues, which may further increase synchronization configuration times between ICs, causing reduced system performance. Time synchronization (i.e. timing drift) is further problematic in systems implementing DRX capabilities, such that time synchronization must be performed often and in short periods of time to effectively implement DRX modes.

Figure 2:
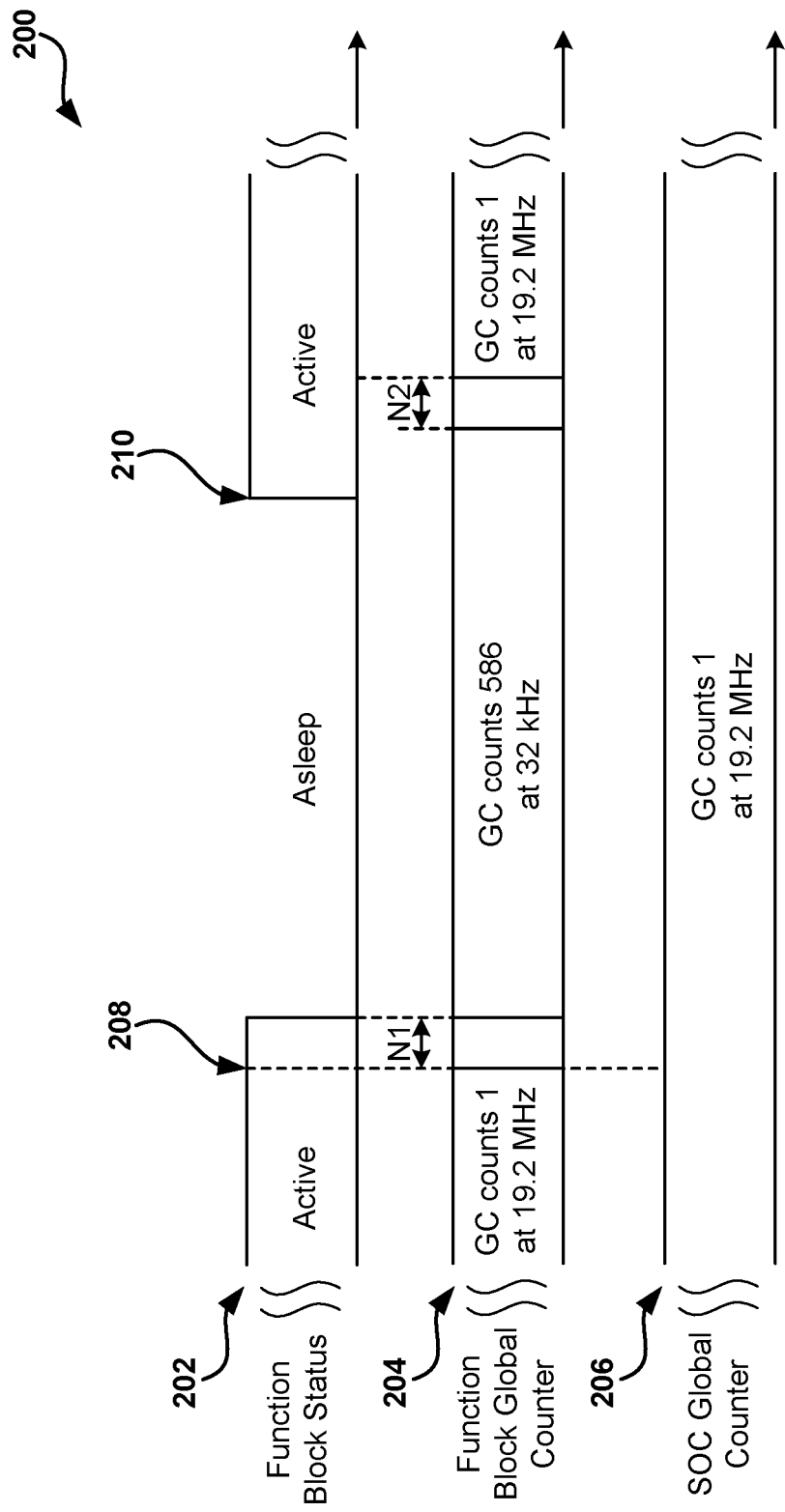
FIG. 2 is a conventional signal timing diagram illustrating a timing flow 200 for global counter timing drift between a function block and an SOC.

FIG. 2 is a conventional signal timing diagram illustrating a timing flow 200 for global counter timing drift between a function block and an SOC according to a conventional embodiment. FIG. 2 illustrates how jitter may be created during transitions between an active (high power) mode and a sleep (low power) mode, such as during DRX implementations. Jitter introduced in any clock in synchronized clocking schemes may cause devices to become unsynchronized. Lack of synchronization between locally stored clocks between communicating ICs and/or function blocks may corrupt data, cause system crashes, increase debugging time or prevent proper debug from occurring, and decrease overall system performance (e.g., additional time needed to perform resynchronization).

Jitter may be introduced into a clocking scheme and cause clocks to become unsynchronized over time. For example, a system may include a function block and an SOC. The function block and the SOC may each receive and independently and locally store a global clock or counter from a same clock source (e.g., PMIC). The global counter stored locally by the function block and SOC may be used to perform synchronous operations within the system. However, jitter may build up over time to cause the function block to become unsynchronized with the SOC.

A function block status 202 indicates transitions between active and sleeps modes, where an active mode may be a high-power or "on" mode, and a sleep mode may be a low power or "off" mode. Transitions between the modes may cause jitter to be introduced to a function block global counter 204, such that there may be a delay due to real world constraints such as hardware limitations, electrical signal travel time, and time to perform software operations. For example, a system may instruct the function block, via a shutdown sequence trigger 208, to transition from an active mode to a sleep mode. The transition may create jitter, or timing drift N1, that offsets the function block global counter 204 by a time value N1 from an SOC global counter 206. The system may then instruct the function block, via a wakeup sequence trigger 210, to transition from a sleep mode to an active mode. The transition may create jitter, or timing drift N2, that offsets the function block global counter 204 by a time value N2 from the SOC global counter 206. The SOC, not being made aware of the jitter or time drift in the function block global counter 204 caused by the transitions between modes, will continue counting the locally stored SOC global counter 206.

Ideally, without accounting for jitter or other real-world impedances, the transitions between active and sleep modes would be seamless, and the function block global counter 204 would continue counting at a rate proportional to the rate and frequency at which the SOC global counter 206 is counting. However, jitter is unavoidable, and may cause the counting of the function block global counter 204 to become unsynchronized with the counting of the SOC global counter 206.

For example, the function block global counter 204 may have a clock frequency corresponding to an active mode (e.g., 19.2 MHz) and a different clock frequency corresponding to a sleep mode (e.g., 32 kHz). Other frequencies than those illustrated may be implemented in some embodiments. When in an active mode, the function block global counter 204 counts at a same rate as the SOC global counter 206 (e.g., counts 1 at 19.2 MHz). When in a sleep mode, the function block global counter 204 counts at a different rate as the SOC global counter 206. For example, the function block global counter counts 586 at 32 kHz for every 1 count of the SOC global counter 206 at 19.2 MHz. N1 may be the time delay for the function block global counter 204 to transition from counting in intervals of 1 corresponding to a 19.2 MHz clock to counting in intervals of 586 corresponding to a 32 kHz clock. N2 may be the time delay for the function block global counter 204 to transition from counting in intervals of 586 corresponding to a 32 kHz clock to counting in intervals of 1 corresponding to a 19.2 MHz clock. N1 and N2 may be time values equal to 52 ns (nanoseconds) according to the example illustrated. Thus, as a result of the shutdown sequence trigger 208 and wakeup sequence trigger 210, the function block global counter 204 may experience a time drift of 104 ns for every full transition cycle (e.g., LTE DRX paging cycle). One or more transition cycles may be performed until the total jitter exceeds a tolerable threshold amount, causing the function block global counter 204 to become unsynchronized with the SOC global counter 206.

In some timing schemes in conventional systems, jitter may be further introduced and therefore may cause an increased chance for global counters of devices to become unsynchronized when more than one device in a system performs mode transitions. For example, although the conventional timing flow 200 illustrates a function block, via the function block status 202, transitioning between active and sleep modes, the SOC may also transition between various power modes as dictated by the system. For example, the SOC may transition between active and sleep modes at the same times as the function block or may transition between modes independent of the function block status 202. Increasing the number of devices transitioning between various power modes may increase the chance for jitter to cause a system to become unsynchronized.

Various embodiments address the aforementioned problems, including problems described with respect to FIGS. 1 and 2, by performing secure timer synchronization between a function block and external SOC. A function block may be in communication with an external and/or third-party function block, IC, SOC, NOC, SIP, or the like, to perform system operations (e.g., implementing RATs, performing server-to-server communications within a network, etc.). Various embodiments provide for increased security between function blocks and external and/or third-party devices in an integrated system, while improving global timer synchronization among devices to implement normal operations and for debugging purposes.

In various embodiments, a system including a function block and an external SOC may include a shared, or joint, register space. The shared register space may be used to isolate various operations of the SOC (e.g., configuration data, requests sent to the function block, and data access attempts) from portions of the function block. For example, the shared register space may provide separate publicly accessible register space within a function block while preventing the SOC from accessing private register space within the function block. The shared register space may allow registers of the function block and its global counter to remain isolated from and inaccessible by the any external device such as an SOC to prevent data corruption or unauthorized accesses. The shared register space may act as a relay or intermediary mechanism for performing timer synchronization upon bootup and resynchronization after bootup while providing additional security measures between devices in an integrated system.

Figure 3:
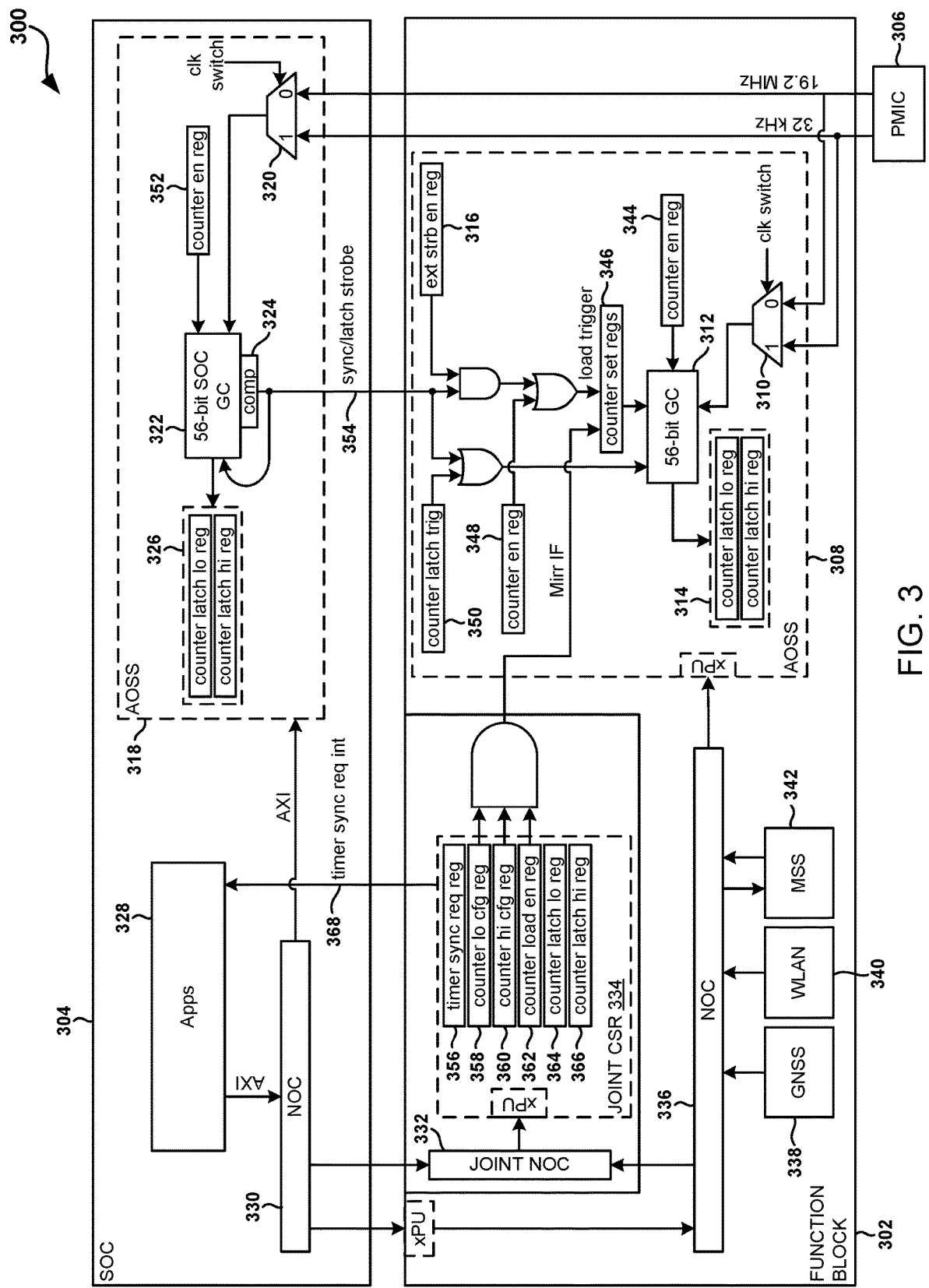
FIG. 3 illustrates a system 300 for performing secure timer synchronization between a function block and an SOC according to some embodiments.

FIG. 3 illustrates an example of a system 300 configured to performing secure timer synchronization between a function block and an SOC according to some embodiments. The system 300 may be implemented to instantiate a synchronized global counter in a function block 302 and an SOC 304. The function block 302 and the SOC 304 may communicate via one or more bus interfaces or interconnections (not shown) to communicate data and configuration messages for performing secure timer synchronization. In some examples, the system 300 may include additional devices (e.g., SOCs, ICs, NOCs, function blocks) that can be synchronized with the function block 302 and SOC 304. For example, the function block 302 is shown as being communicatively coupled to the SOC 304 in the system 300. The SOC 304 is an example device that the function block 302 may be coupled to. For example, the function block 302 may be communicatively coupled to another function block, instead of the SOC 304.

The function block 302 and the SOC 304 may be communicatively coupled to or in communication with external devices within the system 300. For example, the function block 302 and the SOC 304 may be communicatively coupled to a PMIC 306. The function block 302 and the SOC 304 may receive various clock signals from the PMIC 306. For example, the PMIC 306 may store reference clock signals for the function block 302 and the SOC 304 to use for synchronization purposes. The reference clock signals may include clock signals corresponding to an active mode, a sleep mode, or any other predefined mode having a preset frequency. For example, the PMIC may transmit a 19.2 MHz clock corresponding to an active mode to the function block 302 and the SOC 304. For example, the PMIC may transmit a 32 kHz clock corresponding to a sleep mode to the function block 302 and the SOC 304. Other clock frequencies not illustrated in FIG. 3 may be utilized.

The function block 302 and the SOC 304 may have portions of hardware that may be continuously powered and in an active state even when the function block 302 or the SOC 304 are in sleep modes. The function block 302 may have an always-on subsystem (AOSS) 308 that may remain powered and active during sleep mode. The SOC 304 may have an AOSS 318 that may remain powered and active during sleep mode. Components within the AOSS 308 and AOSS 318 may continue to function when the function block 302 and/or the SOC 304 are performing operations according to a sleep mode clock. The AOSS 308 may include a clock multiplexor 310 and the AOSS 318 may include a clock multiplexor 320 to receive various clock signals from the PMIC 306. A processor of the system 300, such as a boot processor or preboot loader (PBL), may configure the clock multiplexor 310 and the clock multiplexor 320 to toggle between clocks for active mode and sleep mode.

The clock multiplexor 310 may transmit the clock signal received from the PMIC 306 to a 56-bit global counter (GC) 312. A processor of the function block 302 may configure the counter enable register 344 to enable the 56-bit GC 312 to start incrementing on every clock edge (e.g., 32 kHz or 19.2 MHz) of the clock signal received from the multiplexor 310. The clock multiplexor 320 may transmit the clock signal received from the PMIC 306 to a 56-bit SOC global counter 322. A processor of the SOC 302 may configure the counter enable register 352 to enable the 56-bit SOC GC 322 to start incrementing on every clock edge (e.g., 32 kHz or 19.2 MHz) of the clock signal received from the multiplexor 320. In some embodiments, the sleep mode clock (e.g., 32 kHz) may be continuously relayed to the function block 302 and the SoC 304, and may be overridden or implemented when the active mode clock (e.g., 19.2 MHz) is enabled or disabled in the PMIC 306.

In some embodiments, the 56-bit GC 312 and the 56-bit SOC GC 322 may be global counters having various bit counting rates. For example, the 56-bit GCs of the function block 302 and the SOC 304 are merely examples referencing the ratio of the active mode and sleep mode clock frequencies, 19.2 MHz and 32 kHz respectively. Different clock frequency values may be used in some embodiments, and therefore the GCs of the function block 302 and the SOC 304 may be referred to as having a different proportional ratio besides 56 bits.

Upon bootup, the PMIC 306 may transmit a same clock signal to the AOSS 308 and AOSS 318 such that the function block 302 and the SOC 304 may boot using a same clock frequency, and may therefore be synchronized until a transition between active and sleep modes is performed in either the function block 302 or the SOC 304. In some embodiments, the function block 302 and the SOC 304 may not be synchronized at bootup even after receiving the same clock signal until certain synchronization processes are performed (e.g., configuring sync/latch strobe 354 as described according to some embodiments).

The AOSS 308 may have function block counter latch registers 314 including counter latch lo registers and counter latch hi registers. The function block counter latch registers 314 can be used to store, or "latch," the current values of the 56-bit GC 312 based at least on when the AOSS 308 receives a sync/latch strobe 354 from the SOC 304. The AOSS 318 may have SOC counter latch registers 326 including counter latch lo registers and counter latch hi registers. The counter latch registers 326 can be used to store, or "latch," the current values of the 56-bit SOC GC 322 based at least on when a comparator 324 of the AOSS 318 is configured to transmit the sync/latch strobe 354. The function block counter latch registers 314 and the SOC counter latch registers 326 may store a "snapshot" of the counters running in the 56-bit GC 312 and the 56-bit SOC GC 322 for use in comparing current timestamps or time values for determining whether any offset exists between the clocks/counters within the 56-bit GC 312 and the 56-bit SOC GC 322. The comparator 324 may be configured with a time delay at which, upon expiration, may cause the comparator to execute the sync/latch strobe 354. The time delay within the comparator 324 may be determined by a processor of the function block 302. In some embodiments, the comparator 324 may be a time comparator including a time stamp register that may be configurable by a processor of the SOC 304 to compare against the 56-bit SOC GC 322. For example, the sync/latch strobe 354 may be generated and transmitted when the counter value of the 56-bit SOC GC 322 matches the configurable value within the time stamp register of the comparator 324.

The sync/latch strobe 354 may be a strobe signal implemented after a delay time in the comparator 324 has expired. The sync/latch strobe 354 may be used to simultaneously capture counter values of the 56-bit GC 312 and the 56-bit SOC GC 322 in the function block counter latch registers 314 and the SOC counter latch registers 326 respectively. The sync/latch strobe 354 may be generated by the AOSS 318 when an application processor (Apps) 328 of the SOC 304 receives a timer synchronization request interrupt 368 from the function block 302. Thus, the sync/latch strobe 354 may be triggered by the function block 302 at bootup or in response to determining that the 56-bit GC 312 and the 56-bit SOC GC 322 need to be resynchronized. A counter latch trigger 350 may be configured by the function block 302 to allow the sync/latch strobe 354 to propagate to the 56-bit GC 312, to cause the current time, time value, timestamp, clock signal, or counter of the 56-bit GC 312 to be stored in the function block counter latch registers 314. The counter latch trigger 350 may be a 1-bit register configurable by the function block 302 to allow gate logic to block or propagate the sync/latch strobe 354. A same single electrical signal of the sync/latch strobe 354 that is used to latch the 56-bit GC 312 into the function block counter latch registers 314 may be used to simultaneously latch the 56-bit SOC GC 322 into the SOC counter latch registers 326. A sync/latch strobe 354 may be generated by the comparator 324 in response to the SOC 304 receiving the timer sync request interrupt 368 at bootup and/or during any resynchronization procedure performed after bootup.

The AOSS 308 may include an external strobe enable register 316 and a counter enable register 348. The function block 302 may configure the external strobe enable register 316 and the counter enable register 348. The function block 302 may configure the external strobe enable register 316 and the counter enable register 348 upon bootup (i.e. cold boot) and when performing resynchronization procedures at the request of the function block 302. The external strobe enable register 316 may be configured to block the sync/latch strobe 354 from the AOSS 308, or to propagate the sync/latch strobe 354 to cause a time value, timer, or counter in counter set registers 346 to be loaded onto the 56-bit GC 312. The external strobe enable register 316 may be enabled by default on bootup or reset to cause sync/latch strobe 354 to be propagated through gate logic of the AOSS 308 without requiring instructions from the processor of the function block 302. The counter enable register 348 may be a 1-bit register configurable by the function block 302. The counter enable register 348 may be enabled by default to prevent further mistimed or unauthorized sync/latch strobe 354 signals from the SOC 304 from latching incorrect clocks. In other words, timer resynchronization between the function block 302 and the SOC 304 may be based at least on the configuration of the external strobe enable register 316 and the counter enable register 348.

The function block 302 may include a shared register space, joint control/status registers (CSR) 334. The joint CSR 334 may be accessed by both the function block 302, via an NOC 336, and the SOC 304, via an NOC 330. The purpose of the joint CSR is to provide separate publicly accessible (i.e. accessible by the SOC 304) register space while preventing the SOC 304 from accessing private register space within the AOSS 308 of the function block 302. The joint CSR 334 may allow registers of the function block 302 and the 56-bit GC 312 to remain isolated from and inaccessible by the SOC 304 to prevent data corruption or unauthorized accesses. The joint CSR 334 may act as a relay or intermediary mechanism for performing timer synchronization upon bootup and resynchronization after bootup while providing additional security measures between devices in an integrated system. The joint CSR 334 may not access the 56-bit GC 312 directly.

The joint CSR 334 may include a timer sync request register 356, joint CSR configuration registers including counter lo configuration register 358 and counter hi configuration register 360, a counter load enable register 362, and joint CSR counter latch registers including counter latch lo register 364 and counter latch hi register 366. The timer sync request register 356 may be a 1-bit register configurable by the processor of the function block 302. The timer sync request register 356 may be configured to cause the function block 302 to generate a timer sync request interrupt 368 and transmit the timer sync interrupt request 368 to the SOC 304 at bootup or resynchronization procedures. In some embodiments, the counter lo configuration register 358 and the counter hi configuration register 360 may receive and store the contents of the SOC counter latch registers 326 in response to the function block 302 generating and transmitting the timer sync request interrupt 368. In some embodiments, the counter latch lo register 364 and the counter latch hi register 364 may receive and store the contents of the SOC counter latch registers 326 in response to the function block 302 generating and transmitting the timer sync request interrupt 368.

The counter lo configuration register 358 and the counter hi configuration register 360 may store a time, timestamp, time value, counter, or clock signal in preparation of being loaded into the counter set registers 346 within the AOSS 308. The content of the counter lo configuration register 358 and the counter hi configuration register 360 may be loaded, or mirrored (i.e. via mirror interface), onto the counter set registers 346 when the counter load enable register 362 is enabled by the function block 302. The counter set registers 346, which may be referred to as preload registers, may store data from the counter lo configuration register 358 and the counter hi configuration register 360 in preparation or performing timer synchronization. The counter set registers 346 may latch, or preload the data from the joint CSR 334 when the counter load enable register is enabled by the function block 302.

The counter load enable register 362 may be configured by the local boot processor of the function block 302 to be enabled upon bootup, such that timer synchronization may be automatically initialized. The counter load enable register 362 may be disabled by the function block 302 after initial timer synchronization is performed upon bootup until the function block 302 determines that the 56-bit GC 312 and the 56-bit SOC GC 322 need to be resynchronized. The counter load enable register 362 may be disabled at times other than at bootup or during resynchronization to prevent loading incorrect timing or sequencing data to the counter set registers 346. Thus, the 56-bit GC 312 may remain isolated and uninfluenced by mistimed signals, unauthorized access attempts, or corrupted data or communications received from the SOC 304.

The joint CSR counter latch registers including the counter latch lo register 364 and the counter latch hi register 366 may store a snapshot of the 56-bit SOC GC 322 as latched into the SOC counter latch registers 326 in response to an instance of the sync/latch strobe 354 as described in embodiments. For example, the counter latch lo register 364 and the counter latch hi register 366 may receive and store the same time, time value, timestamp, counter, or clock signal as the counter lo configuration register 358 and the counter hi configuration register 360. The counter latch lo register 364 and the counter latch hi register 366 may be read by a processor of the function block 302 to compare against the contents of the function block counter latch registers 314 to determine whether a time offset exists between the 56-bit GC 312 and the 56-bit SOC GC 322. In some embodiments, the function block 302 may analyze the contents of the counter lo configuration register 358 and the counter hi configuration register 360 to compare against the contents of the function block counter latch registers 314 to determine whether a time offset exists between the 56-bit GC 312 and the 56-bit SOC GC 322.

In some embodiments, the counter latch lo register 364 and the counter latch hi register 366 may be stored in a private space of the function block 302 separate from the joint CSR 334. This may prevent unauthorized access or manipulation of the content of the counter latch lo register 364 and the counter latch hi register 366, where the content maybe used for determining whether resynchronization between devices is needed and/or for debugging purposes (e.g., debugging using uncorrupted timestamps). In some embodiments, the function block 302 may analyze the contents of the counter lo configuration register 358 and the counter hi configuration register 360, and/or the contents of the counter latch lo register 364 and the counter latch hi register 366 for debugging purposes.

The timer sync request interrupt 368 may interrupt the processes of the SOC 304 to cause the SOC 304, via comparator 324, to generate the sync/latch strobe 354. Based on the timer sync interrupt request 368, the sync/latch strobe 354 may cause the 56-bit GC 312 to latch current time values into the function block counter latch registers 314 and the 56-bit SOC GC 322 to latch current time values into the SOC counter latch registers 326. The timer sync request interrupt 368 may include instructions to configure the SOC 304 to transmit the content of the SOC counter latch registers 326 to the joint CSR 334. In response to the timer sync request interrupt 368, the received content of the SOC counter latch registers 326 may be stored in the counter lo configuration register 358 and the counter hi configuration register 360, and/or in the counter latch lo register 364 and counter latch hi register 366.

The timer sync interrupt request 368 may be instantiated during multiple events at bootup, to determine whether resynchronization is needed and to perform timer resynchronization. The timer sync request interrupt 368 may be transmitted to cause current time values according to the 56-bit GC 312 and the 56-bit SOC GC 322 to be latched into their respective counter latch registers (e.g., 314 and 326) as described in some embodiments. The shared register space of the joint CSR 334 may then receive the time values from the SOC counter latch registers 326, and store the time values in the joint CSR 334. A processor of the function block 302 may then read and compare the values stored in the joint CSR 334 to the values in the function block counter latch registers 314 to determine whether offset or time drift exists outside of an acceptable threshold. If the function block 302 determines that no time offset exists or a detected time offset is within an acceptable threshold range (i.e. the offset does not cause the 56-bit GC 312 and the 56-bit SOC GC to become unsynchronized), resynchronization processes may not be performed.

If the function block 302 determines that a detected time offset is not within an acceptable threshold range (i.e. the offset does may cause the 56-bit GC 312 and the 56-bit SOC GC to become unsynchronized), resynchronization processes may be performed. In response to determining that resynchronization is needed, the function block 302 may generate an additional timer sync request interrupt 368 to perform resynchronization processes. In conjunction with, or prior to the timer sync request interrupt 368 being generated and transmitted to the SOC 304, the function block may configure the counter load enable register 362 and the external strobe enable register 316. The counter enable register 362 may load the timing information (i.e. as received from the SOC counter latch enable registers 326 as a result of the initial timer sync request interrupt 368) stored in the counter hi configuration register 358 and the counter lo configuration register 360 onto the counter set registers 346. In response to the timer sync interrupt request 368, the sync/latch strobe may be instantiated to push the content of the counter set registers 346 onto the 56-bit GC 312, causing the function block 302 and the SOC 304 to become synchronized.

SOC 304 access of the joint CSR 334 may be limited by the function block 302. The SOC Apps 328 of the SOC and the processor of the function block 302 may access the joint CSR 334 through conventional interfaces connected to a dedicated joint NOC 332. In some embodiments, secure registers in the joint CSR 334 (e.g., the counter latch lo register 364 and the counter latch hi register 366) may only be accessible by the function block 302. For example, the secure registers in the joint CSR 334 inaccessible by the SOC 304 may be Modem Secure Authentication (MSA) protected. The CSR slave side access protection unit may differentiate the secure and non-secure register space. The Apps 328 may access components of the function block 302 through regular bus interfaces in the mission mode. In some embodiments, the bus interfaces may include access protection units (xPUs), which block access by the SOC 304 by default at the reset. The SOC 304 access to the function block 302 may be released when an xPU is configured as part of the function block 302 boot procedure.

In some embodiments, the counter load enable register 362 may be tied to an MSA bit or register. Thus, the function block may set an MSA bit tied to the functionality of the counter load enable register 362 in order to trigger or otherwise prepare the counter load enable register to be set. In response to the counter load enable register being set or configured, the xPUs may allow access to various portions of the function block 302 as shown in FIG. 3. For example, configuring the MSA bit may allow the NOC 330 of the SOC 304 to communicate via bus interfaces with the NOC 336 of the function block 302. xPUs may be configured internally by the processor of the function block 302 or a processor of an external device within the system 300. Thus, the SOC 304 may not influence the xPU configuration and therefore may not access processes without permission of the function block 302 via counter load enable register 362 until the MSA bit is set. The MSA bit may be configured on bootup to prevent unauthorized access of the function block 302 by the SOC 304.

The function block 302 may include modules communicatively coupled to the NOC 336 to perform various functions for performing timer resynchronization, such as a global navigation subsystem (GNSS) 338, a wireless local area network (WLAN) 340, and a modem subsystem (MSS) 342. The various network components of the function block 302 and the SOC 304 may be communicatively coupled to each other via conventional bus interfaces such as an advanced extensible interface (AXI). For example, the various connections illustrated between the AOSS 318, the Apps 328, the NOC 330, the joint NOC 332, the NOC 336, the GNSS 338, the WLAN 340, the MSS 342, and the AOSS 308 may be AXI or other conventional bus interfaces.

Figure 4:
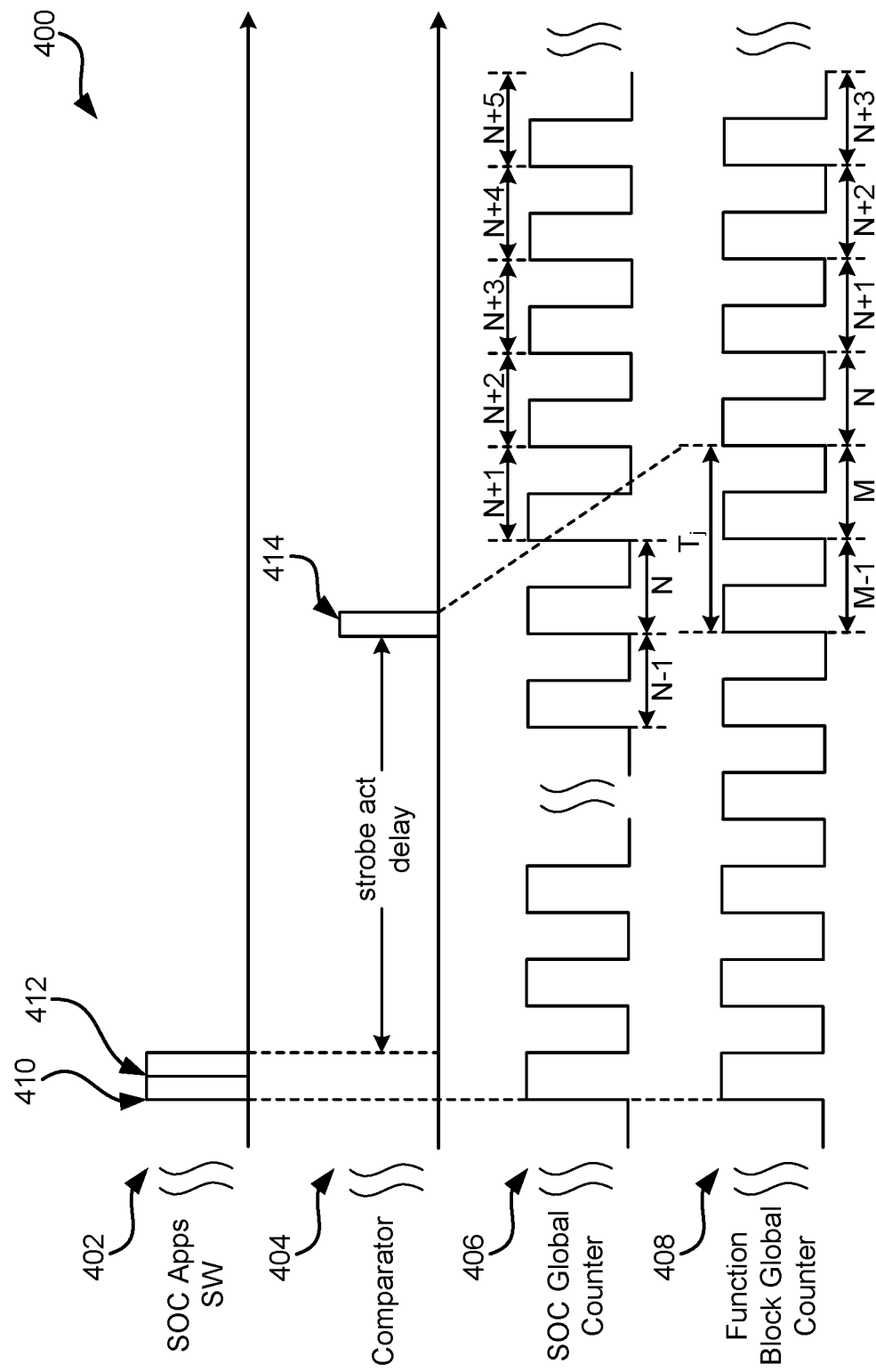
FIG. 4 is a signal timing diagram illustrating a timing flow 400 for secure timer synchronization between a function block and an external SOC according to some embodiments.

FIG. 4 is a signal timing diagram illustrating a timing flow 400 for secure timer synchronization between a function block and an external SOC according to some embodiments. During a cold boot, a function block and an SOC may be brought out of reset, causing the SOC global counter and function block global counter to start counting from 0. The first instruction in the PBL sequence may trigger a strobe (e.g., sync/latch strobe 354 as described with reference to FIG. 3) for latching the global counter reference time marker. As described with reference to FIG. 2, jitter may be introduced into a synchronized clocking scheme during transitions between active and sleep modes, which may cause the function block global counter to become unsynchronized with the SOC global counter. The offset between counters may depend on the number of transitions between active mode and sleep mode in the function block and/or the SOC. Thus, hence global counter accumulated jitter should be corrected periodically.

In some embodiments, a processor of a function block may determine that global counters of the function block and of an SOC, or any other function block, have become unsynchronized and should therefore be resynchronized. The function block may send a time sync interrupt (e.g., time sync request interrupt 368) to the SOC application processor (e.g., Apps 328). In response to receiving the time sync interrupt, the application processor may generate and transmit a strobe to capture a current time of the function block global counter and a current time of the SOC global counter. The SOC counter value may be relayed to a shared register space (e.g., joint CSR 334) in the function block, and the shared register space may trigger an interrupt to be transmitted to the function block. The function block may then read the SOC counter time and function block global counter time to determine if the offset is tolerable to the modem.

If the function block determines the offset is not tolerable (i.e. outside of a threshold range), the function block may write a register in shared register space to generate a timer sync interrupt (e.g., timer sync request interrupt 368) to the SOC application processor. The function block may configure the global counter preload interface and also configure the function block to accept an incoming strobe from the SOC. In response to the strobe, the SOC application processor may configure a future timestamp in the global counter preload registers (e.g., the counter lo configuration register 358 and the counter hi configuration register 360) in the shared register space that may be copied into local global counter set registers (e.g., counter set registers 346) of the function block. The SOC application processor may configure a comparator (e.g., comparator 324) with the future timestamp already configured in the shared register space for generating a sync strobe towards the function block global counter. When the value in the comparator matches the SOC counter current value, the comparator may generate and transmit a strobe which may propagate to the function block global counter. The sync strobe may cause the configured timestamp in the set registers to be loaded into the function block global counter, causing the function block global counter and SOC global counter to be synchronized and start counting the same value. In some embodiments, the strobe propagation may cause two clock cycles of jitter due to clock domain crossing between the function block and the SOC. After synchronization is complete, the function block may disable the sync strobe signal and counter load enable signal to avoid any unauthorized preload requests from the SOC.

For example, FIG. 4 illustrates an SOC Apps software (SW) timeline 402, a comparator timeline 404, an SOC global counter 406, and a function block global counter 408. The SOC Apps SW timeline 402 may include trigger events 410 and 412. The trigger event 410 may represent when the SOC Apps SW configures the comparator to transmit the sync strobe at a time N according to the SOC global counter 406. The trigger event 412 may represent when the SOC Apps SW transmits a preload value (i.e. preload value N), such as a 56-bit preload value (e.g., from the SOC counter latch registers 326), to the shared register space (e.g., joint CSR 334). The trigger events 410 and 412 may require time to be processed by the processor of the SOC as illustrated in the SOC Apps SW timeline 402. In some embodiments, the trigger events 410 and 412 may be executed simultaneously or approximately simultaneously with respect to each other.

After SOC Apps SW executes the trigger events 410 and 412, the comparator, in response to being configured by the trigger event 410, may initiate a countdown or count up timer, or a delay value sometime after the trigger event 410. The end of the timer or delay value may signify when the comparator should generate and propagate the strobe throughout the system (i.e. to the function block and SOC), as shown by trigger event 414. For example, the strobe act delay between the trigger event 412 and the trigger event 414 may be based on a time value determined from the SOC global counter 406, such that the strobe may be propagated by the comparator at a time corresponding to when the SOC global 406 reaches an "N" timestamp or count. At time "N," the function block global counter 408 is out of sync with the SOC global counter 406 by a number of clock cycles. The function block global counter 408 may have become unsynchronized with the SOC global counter 406 due to a total jitter value "$T_j$" resulting from transitions of the function block between active and sleep modes. The function block global counter 408, being out of sync with the time N, may therefore be counting according to an unsynchronized time M, such that the function block global counter 408 is some number of cycles behind the SOC global counter 406, and/or the rising and falling clock edges of the global counters do not align. Upon execution of trigger event 414 at time N, the preload counter value stored in the shared register space, which has already been loaded in preload registers of the function block (e.g., counter set registers 346) is loaded onto the function block global counter and instantiated at time N. The time N with respect to the function block global counter 408 may be instantiated one or more clock cycles after the time N occurs with respect to the SOC global counter 406 to account for jitter. Thus, the function block global counter 408 may be resynchronized with the SOC global counter 406. The process may be continuously repeated for additional jitter introduced by future transitions between active and sleep modes.

Figure 5:
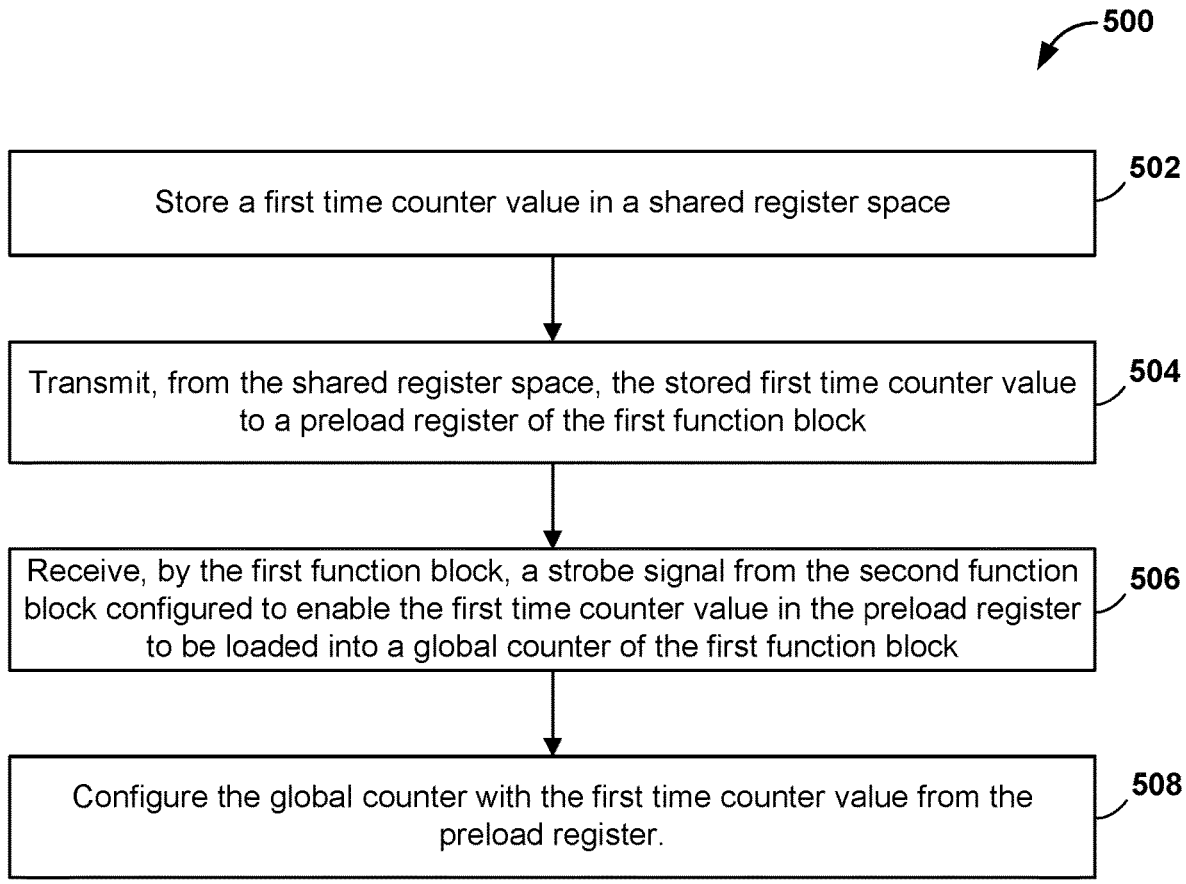
FIG. 5 is a process flow diagram illustrating a method 500 for performing secure timer synchronization between function blocks according to some embodiments.

FIG. 5 is a process flow diagram illustrating a method 500 for performing secure timer synchronization between function blocks according to some embodiments. With reference to FIGS. 1-5, the method 500 may be implemented by a processor of a function block (e.g., function block 302) that may be configured with processor-executable instructions in a non-transitory processor readable medium to perform operations of the method. The method 500 may be performed by a processor of a first function block for providing secure timer synchronization with a second function block (e.g., SOC 304).

The order of operations performed in blocks 502-508 is merely illustrative, and the operations of blocks 502-508 may be performed in any order and partially simultaneously in various embodiments. In some embodiments, the method 500 may be performed by a processor independently from, but in conjunction with, the SOC 304. For example, the method 500 may be implemented as a software module executing within a processor of an SoC or in dedicated hardware within an SoC that monitors data and commands from/within a function block and is configured to take actions and store data as described. For ease of reference, the various elements performing the operations of the method 500 are referred to in the following method descriptions as a "processor."

In block 502, the processor may perform operations including storing a first time counter value in a shared register space. In some embodiments, the first time counter value may be based on a global counter of the second function block (e.g., SOC 304). For example, the first time counter value may be a counter value corresponding to a current clock signal of a second function block to be synchronized with the first function block (e.g., function block 302). In some embodiments, the first time counter value may be a time, a time value, a timestamp, a clock signal, or a counter. The shared register space (e.g., joint CSR 334) may include one or more public registers accessible by both the first function block and the second function block. In some embodiments, the shared register space may be located within a portion of the first function block. For example, with reference to FIG. 3, the first time counter value may be sourced from the SOC counter latch registers 326 that was latched into the SOC counter latch registers 326 when sync/latch strobe 354 is implemented.

In block 504, the processor may perform operations including transmitting, from the shared register space, the stored first time counter value to a preload register of the first function block. The first function block may transmit the first time counter value from the shared register space to a preload register (e.g., counter set registers 346) that is inaccessible by the second function block.

In block 506, the processor may perform operations including receiving, by the first function block, a strobe signal from the second function block configured to enable the first time counter value in the preload register to be loaded into a global counter of the first function block.

In block 508, the processor may perform operations including configuring the global counter with the first time counter value from the preload register. In response to receiving the strobe signal as described in block 506, the first time counter value stored within the preload value may be loaded onto the first function block global counter or otherwise used to configure the global counter of the first function block. Because the first time counter value in the preload register is based at least on a global counter of the second function block, pushing the first time counter value onto the global counter of the first function block may cause the global counters of the first function block and the second function block to become synchronized.

Figure 6:
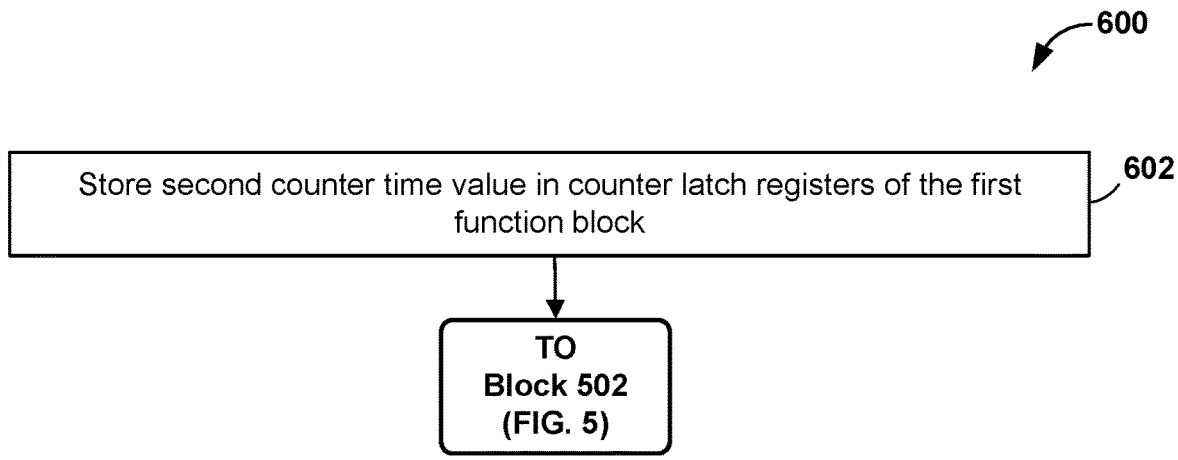
FIG. 6 is a process flow diagram illustrating alternative operations that may be performed by a processor of a function block as part of the method 500 for performing secure timer synchronization between function blocks according to some embodiments.

FIG. 6 is a process flow diagram illustrating alternative operations that may be performed by a processor of a function block as part of the method 500 for performing secure timer synchronization between function blocks according to some embodiments. With reference to FIGS. 1-6, the method 600 may be implemented by a processor of a function block (e.g., function block 302) that may be configured with processor-executable instructions in a non-transitory processor readable medium to perform operations of the method. The method 600 may be performed by a processor of a first function block for providing secure timer synchronization with a second function block (e.g., SOC 304).

In block 602, the processor may perform operations including storing a second time counter value in counter latch registers of the first function block. In some embodiments, the strobe signal may be further configured to enable the first function block to store a second time counter value based on a global counter of the first function block.

The processor may then proceed to perform the operations of block 502 of the method 500 (FIG. 5) as described.

Figure 7:
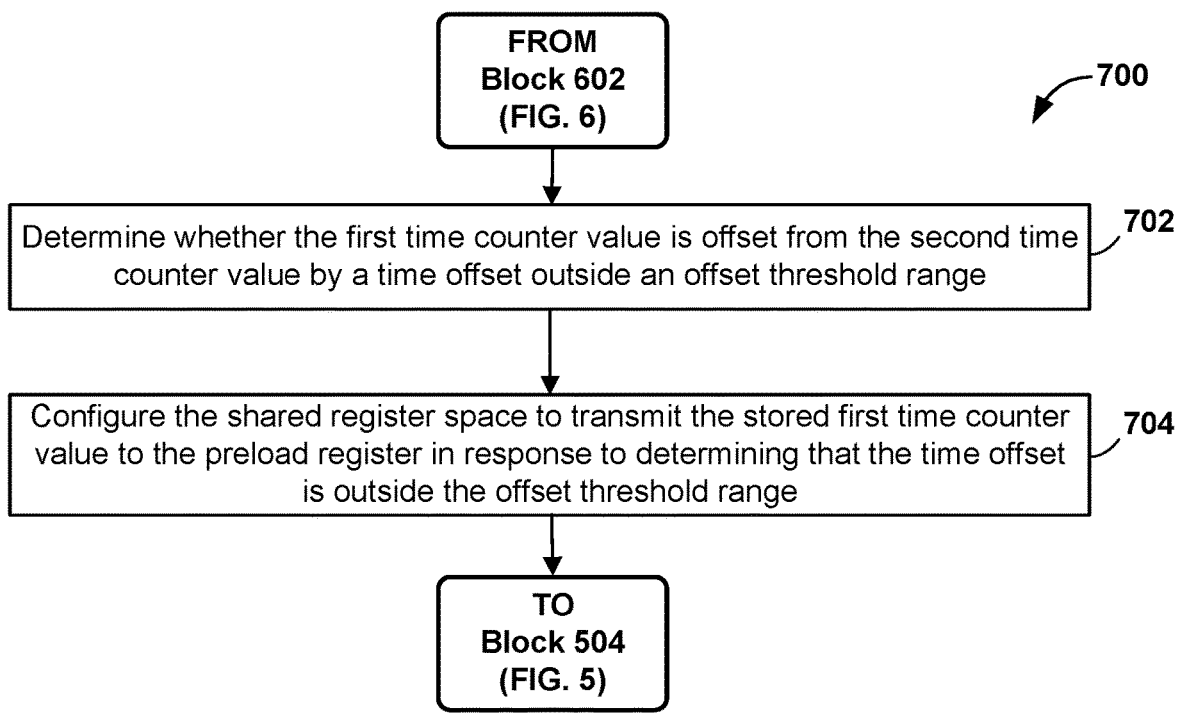
FIG. 7 is a process flow diagram illustrating alternative operations that may be performed by a processor of a function block as part of the method 500 for performing secure timer synchronization between function blocks according to some embodiments.

FIG. 7 is a process flow diagram illustrating alternative operations that may be performed by a processor of a function block as part of the method 500 for performing secure timer synchronization between function blocks according to some embodiments. With reference to FIGS. 1-7, the method 700 may be implemented by a processor of a function block (e.g., function block 302) that may be configured with processor-executable instructions in a non-transitory processor readable medium to perform operations of the method. The method 700 may be performed by a processor of a first function block for providing secure timer synchronization with a second function block (e.g., SOC 304).

Following the performance of the operations of block 602 of the method 600 (FIG. 6), the processor may perform operations including determining whether the first time counter value is offset from the second time counter value by a time offset outside an offset threshold range in block 702.

In block 704, the processor may perform operations including configuring the shared register space to transmit the stored first time counter value to the preload register in response to determining that the time offset is outside the offset threshold range.

The processor may then proceed to perform the operations of block 504 of the method 500 (FIG. 5) as described.

Figure 8:
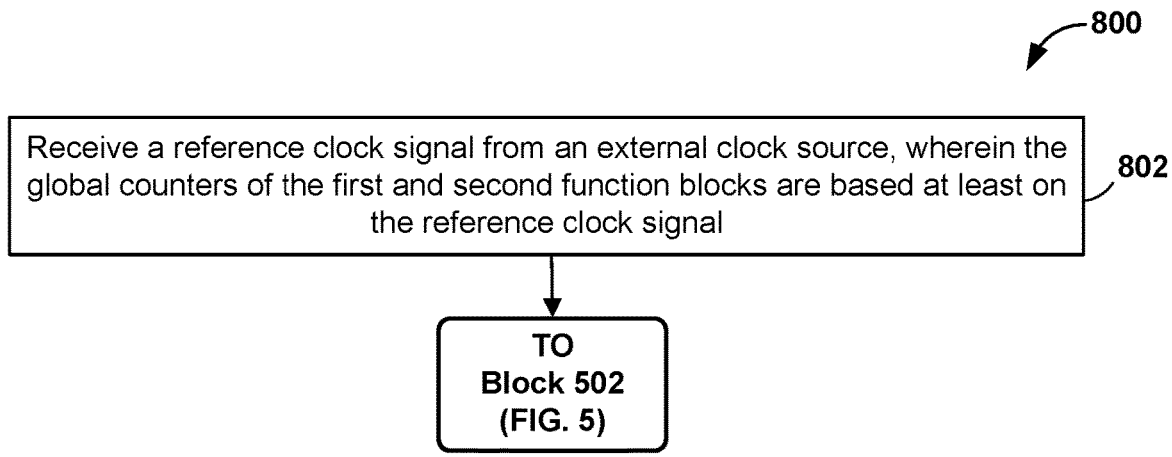
FIG. 8 is a process flow diagram illustrating alternative operations that may be performed by a processor of a function block as part of the method 500 for performing secure timer synchronization between function blocks according to some embodiments.

FIG. 8 is a process flow diagram illustrating alternative operations that may be performed by a processor of a function block as part of the method 500 for performing secure timer synchronization between function blocks according to some embodiments. With reference to FIGS. 1-8, the method 800 may be implemented by a processor of a function block (e.g., function block 302) that may be configured with processor-executable instructions in a non-transitory processor readable medium to perform operations of the method. The method 800 may be performed by a processor of a first function block for providing secure timer synchronization with a second function block (e.g., SOC 304).

In block 802, the processor may perform operations including receiving a reference clock signal from an external clock source, wherein the global counters of the first and second function blocks are based at least on the reference clock signal.

The processor may then proceed to perform the operations of block 502 of the method 500 (FIG. 5) as described.

Figure 9:
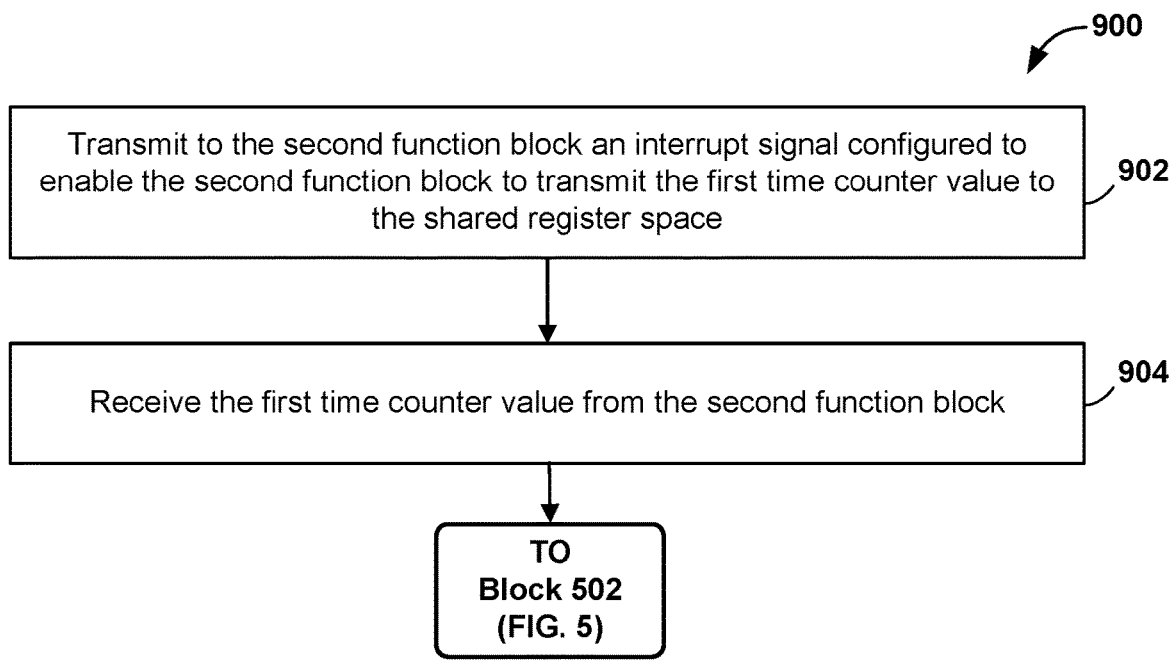
FIG. 9 is a process flow diagram illustrating alternative operations that may be performed by a processor of a function block as part of the method 500 for performing secure timer synchronization between function blocks according to some embodiments.

FIG. 9 is a process flow diagram illustrating alternative operations that may be performed by a processor of a function block as part of the method 500 for performing secure timer synchronization between function blocks according to some embodiments. With reference to FIGS. 1-9, the method 900 may be implemented by a processor of a function block (e.g., function block 302) that may be configured with processor-executable instructions in a non-transitory processor readable medium to perform operations of the method. The method 900 may be performed by a processor of a first function block for providing secure timer synchronization with a second function block (e.g., SOC 304).

In block 902, the processor may perform operations including transmitting to the second function block an interrupt signal configured to enable the second function block to transmit the first time counter value to the shared register space.

In block 904, the processor may perform operations including receiving the first time counter value from the second function block.

The processor may then proceed to perform the operations of block 502 of the method 500 (FIG. 5) as described.

Figure 10:
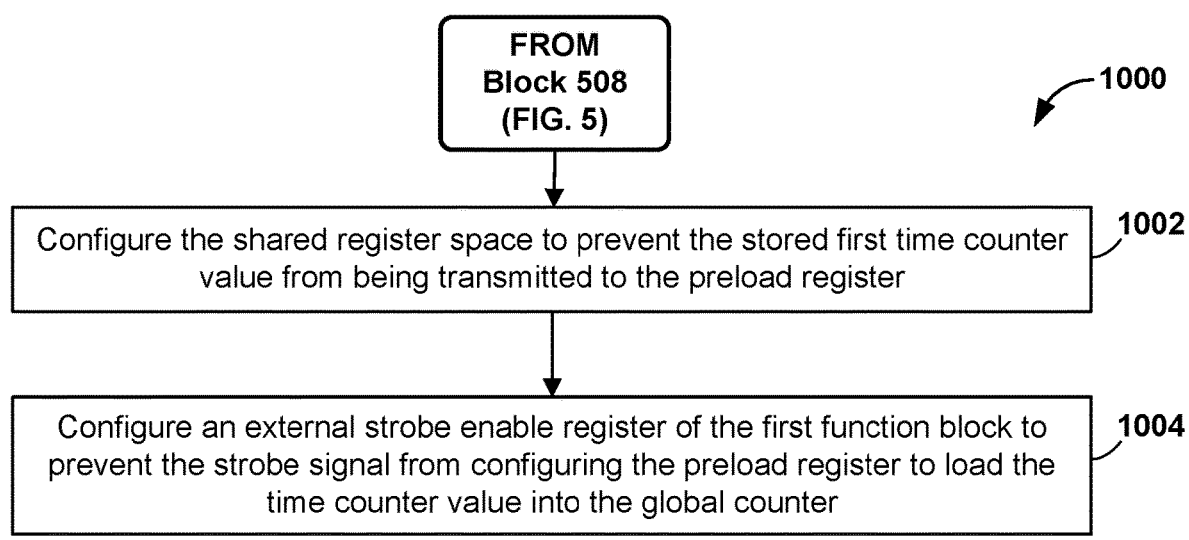
FIG. 10 is a process flow diagram illustrating alternative operations that may be performed by a processor of a function block as part of the method 500 for performing secure timer synchronization between function blocks according to some embodiments.

FIG. 10 is a process flow diagram illustrating alternative operations that may be performed by a processor of a function block as part of the method 500 for performing secure timer synchronization between function blocks according to some embodiments. With reference to FIGS. 1-10, the method 1000 may be implemented by a processor of a function block (e.g., function block 302) that may be configured with processor-executable instructions in a non-transitory processor readable medium to perform operations of the method. The method 1000 may be performed by a processor of a first function block for providing secure timer synchronization with a second function block (e.g., SOC 304).

Following the performance of the operations of block 508 of the method 500 (FIG. 5), the processor may perform operations including configuring the shared register space to prevent the stored first time counter value from being transmitted to the preload register in block 1002.

In block 1004, the processor may perform operations including configuring an external strobe enable register of the first function block to prevent the strobe signal from configuring the preload register to load the time counter value into the global counter.

Figure 11:
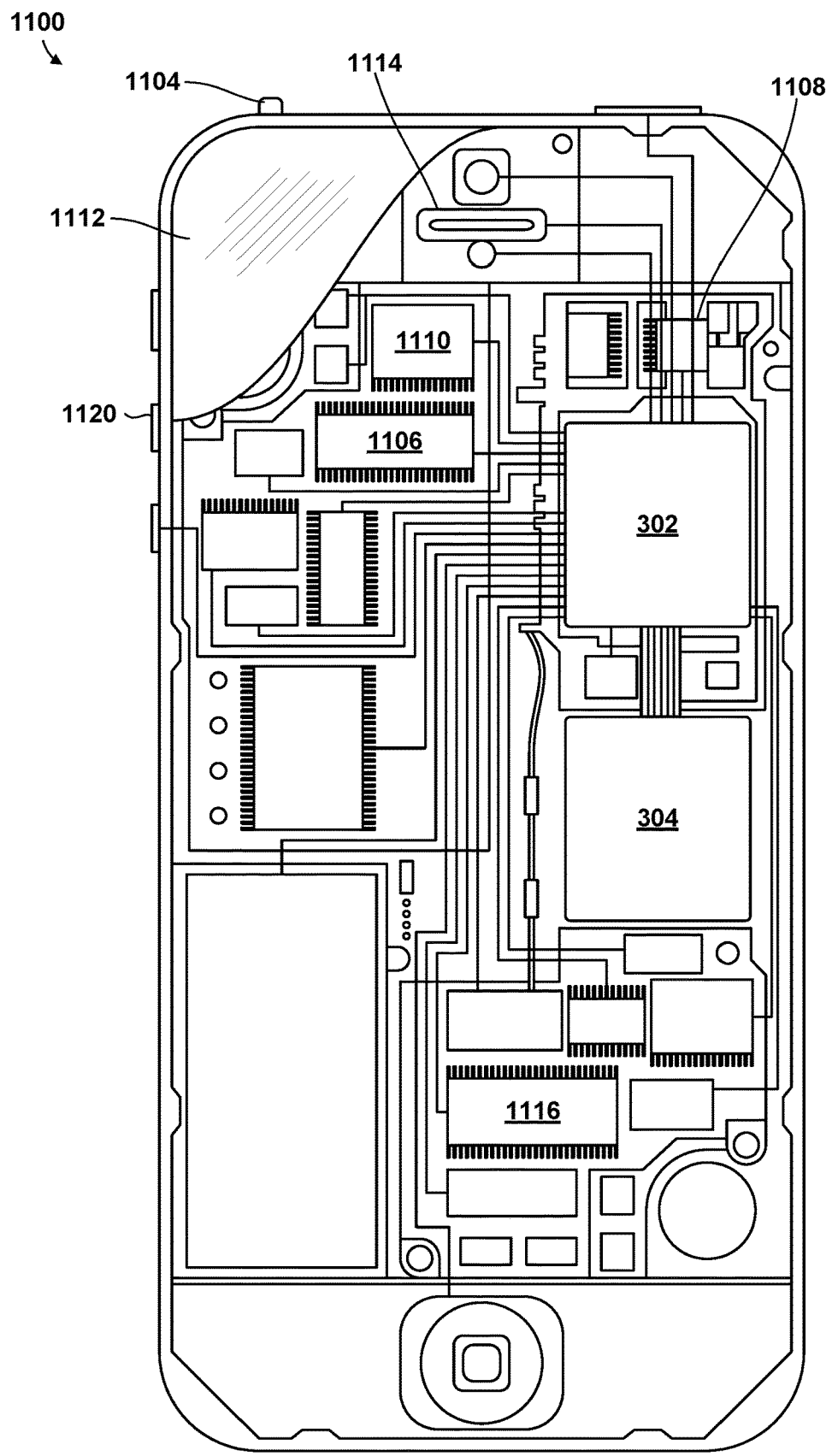
FIG. 11 is a component block diagram of an example wireless device in the of a smartphone 1100 suitable for implementing various embodiments.

FIG. 11 is a component block diagram of an example wireless device in the form of a smartphone 1100 suitable for implementing some embodiments. A smartphone 1100 may include a first processing device such as function block 302 coupled to a second processing device such as SOC 304. The function block 302 and SOC 304 may be 5G capable SOCs. The function block 302 and the SOC 304 may be coupled to internal memory 1106, 1116, a display 1112, and to a speaker 1114. Additionally, the smartphone 1100 may include an antenna 1104 for sending and receiving electromagnetic radiation that may be connected to a wireless data link or cellular telephone transceiver 1108 coupled to one or more processors in the function block 302 and the SOC 304. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the function block 302 and the SOC 304, wireless transceiver 1108 and CODEC 1110 may include a digital signal processor (DSP) circuit (not shown separately).

The processors of the smart phone 1100 may be any programmable microprocessor, microcomputer or multiple processor chip or chips that may be configured by processor-executable instructions to perform a variety of functions, including the functions of the various implementations described herein. In some mobile devices, multiple processors may be provided, such as one processor within a function block 302 dedicated to wireless communication functions and one processor within an SOC 304 dedicated to running other applications. Typically, software applications may be stored in the memory 1106, 1116 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods disclosed herein may be substituted for or combined with one or more operations of the methods disclosed herein.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e. one or more modules of computer program instructions, encoded on a computer storage media for execution by, or to control the operation of, data processing apparatus.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method performed by a first function block for providing secure timer synchronization with a second function block, comprising:
    storing a first time counter value in a shared register space, wherein the first time counter value is based on a global counter of the second function block;
    storing a second time counter value in counter latch registers of the first function block, wherein the second time counter value is based on a global counter of the first function block;
    transmitting the stored first time counter value from the shared register space to a preload register of the first function block;
    receiving, by the first function block, a strobe signal from the second function block configured to enable the first time counter value in the preload register to be loaded into a global counter of the first function block and to enable the first function block to store the second time counter value; and
    configuring the global counter of the first function block with the first time counter value from the preload register.

2. The method of claim 1, further comprising:
    determining whether the first time counter value is offset from the second time counter value by a time offset outside an offset threshold range; and
    configuring the shared register space to transmit the stored first time counter value to the preload register in response to determining that the time offset is outside the offset threshold range.

3. The method of claim 1, further comprising:
    receiving a reference clock signal from an external clock source, wherein the global counters of the first and second function blocks are based at least on the reference clock signal.

4. The method of claim 1, further comprising:
    transmitting to the second function block an interrupt signal configured to enable the second function block to transmit the first time counter value to the shared register space; and
    receiving the first time counter value from the second function block.

5. The method of claim 1, further comprising:
    configuring the shared register space to prevent the stored first time counter value from being transmitted to the preload register; and
    configuring an external strobe enable register of the first function block to prevent the strobe signal from configuring the preload register to load the first time counter value into the global counter.

6. The method of claim 1, wherein the shared register space is a portion of the first function block.

7. An electronic device, comprising:
    a first function block comprising a processor, a preload register and a global counter;
    a second function block; and
    a shared register space accessible by both the first and second function blocks,
    wherein the first function block is configured to:
        store a first time counter value in the shared register space, wherein the first time counter value is based on a global counter of the second function block;
        store a second time counter value in counter latch registers of the first function block, wherein the second time counter value is based on a global counter of the first function block;
        transmit the stored first time counter value from the shared register space to the preload register of the first function block;
        receive a strobe signal from the second function block configured to enable the first time counter value in the preload register to be loaded into the global counter of the first function block and to enable the first function block to store the second time counter value; and
        configure the global counter of the first function block with the first time counter value from the preload register.

8. The electronic device of claim 7, wherein the first function block is further configured to:
    determine whether the first time counter value is offset from the second time counter value by a time offset outside an offset threshold range; and
    configure the shared register space to transmit the stored first time counter value to the preload register in response to determining that the time offset is outside the offset threshold range.

9. The electronic device of claim 7, wherein the first function block is further configured to:
    receive a reference clock signal from an external clock source, wherein the global counter of the first function block and the global counter of the second function blocks are based at least on the reference clock signal.

10. The electronic device of claim 7, wherein the first function block is further configured to:
    transmit to the second function block an interrupt signal configured to enable the second function block to transmit the first time counter value to the shared register space; and
    receive the first time counter value from the second function block.

11. The electronic device of claim 7, wherein the first function block is further configured to:
    configure the shared register space to prevent the stored first time counter value from being transmitted to the preload register; and
    configure an external strobe enable register of the first function block to prevent the strobe signal from configuring the preload register to load the first time counter value into the global counter of the first function block.

12. The electronic device of claim 7, wherein the shared register space is a portion of the first function block.

13. An electronic device, comprising:
    a first function block comprising a processor, a preload register and a global counter;
    a second function block; and
    a shared register space accessible by both the first and second function blocks,
    means for storing a first time counter value in the shared register space, wherein the first time counter value is based on a global counter of the second function block;

means for storing a second time counter value in counter latch registers of the first function block, wherein the second time counter value is based on a global counter of the first function block;

means for transmitting the stored first time counter value from the shared register space to the preload register of the first function block;

means for receiving a strobe signal from the second function block configured to enable the first time counter value in the preload register to be loaded into the global counter of the first function block and to enable the first function block to store the second time counter value; and means for configuring the global counter of the first function block with the first time counter value from the preload register.

14. The electronic device of claim 13, further comprising:
means for determining whether the first time counter value is offset from the second time counter value by a time offset outside an offset threshold range; and
means for configuring the shared register space to transmit the stored first time counter value to the preload register in response to determining that the time offset is outside the offset threshold range.

15. The electronic device of claim 13, further comprising:
means for receiving a reference clock signal from an external clock source, wherein the global counter of the first function block and the global counter of the second function blocks are based at least on the reference clock signal.

16. The electronic device of claim 13, further comprising:
means for transmitting to the second function block an interrupt signal configured to enable the second function block to transmit the first time counter value to the shared register space; and
means for receiving the first time counter value from the second function block.

17. The electronic device of claim 13, further comprising:
means for configuring the shared register space to prevent the stored first time counter value from being transmitted to the preload register; and
means for configuring an external strobe enable register of the first function block to prevent the strobe signal from configuring the preload register to load the first time counter value into the global counter of the first function block.

18. The electronic device of claim 13, wherein the shared register space is a portion of the first function block.

19. A first function block for use in an electronic device that includes a second function block, comprising:
a preload register;
a global counter; and
a processor coupled to the preload register and the global counter, wherein the first function block is configured to:
store a first time counter value in a shared register space, wherein the first time counter value is based on a global counter of the second function block;
store a second time counter value in counter latch registers of the first function block, wherein the second time counter value is based on a global counter of the first function block;
transmit the stored first time counter value from the shared register space to the preload register;
receive a strobe signal from the second function block configured to enable the first time counter value in the preload register to be loaded into the global counter and to enable the first function block to store the second time counter value; and
configure the global counter with the first time counter value from the preload register.

20. The first function block of claim 19, wherein the first function block is further configured to:
determine whether the first time counter value is offset from the second time counter value by a time offset outside an offset threshold range; and
configure the shared register space to transmit the stored first time counter value to the preload register in response to determining that the time offset is outside the offset threshold range.

21. The first function block of claim 19, wherein the processor is further configured to:
receive a reference clock signal from an external clock source, wherein the global counter of the first function block is based at least on the reference clock signal.

22. The first function block of claim 19, wherein the first function block is further configured to:
transmit to the second function block an interrupt signal configured to enable the second function block to transmit the first time counter value to the shared register space; and
receive the first time counter value from the second function block.

23. The first function block of claim 19, wherein the first function block is further configured to:
configure the shared register space to prevent the stored first time counter value from being transmitted to the preload register; and
configure an external strobe enable register of the first function block to prevent the strobe signal from configuring the preload register to load the first time counter value into the global counter.

24. The first function block of claim 19, wherein the shared register space is a portion of the first function block.

* * * * *